W. D. & W. E. McBRIDE.
COMPUTING SCALE.
APPLICATION FILED SEPT. 30, 1913.
1,118,666.
Patented Nov. 24, 1914.
3 SHEETS—SHEET 2.
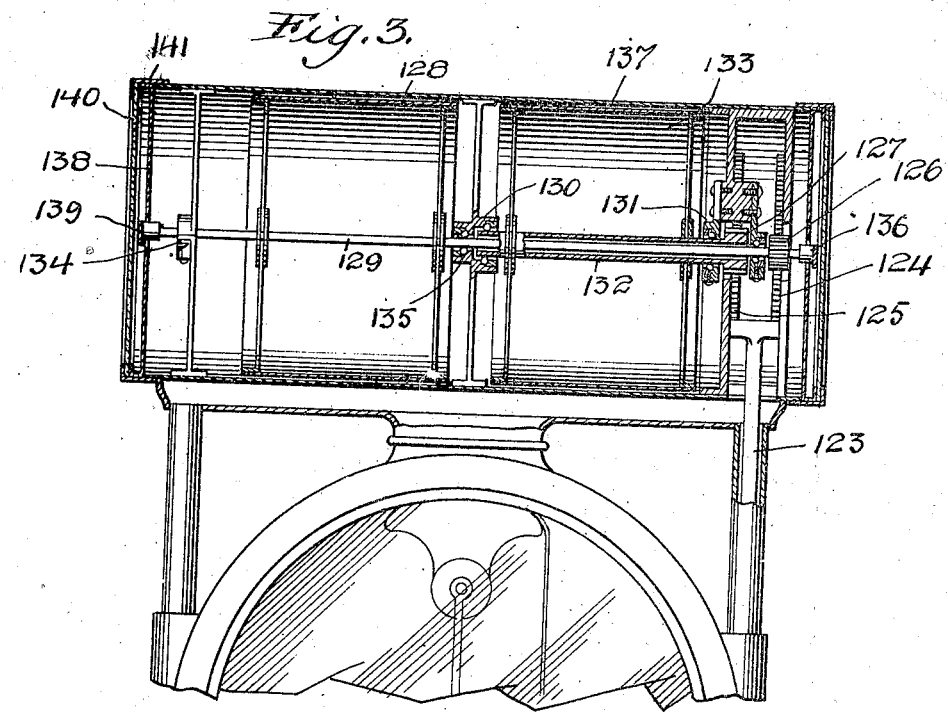
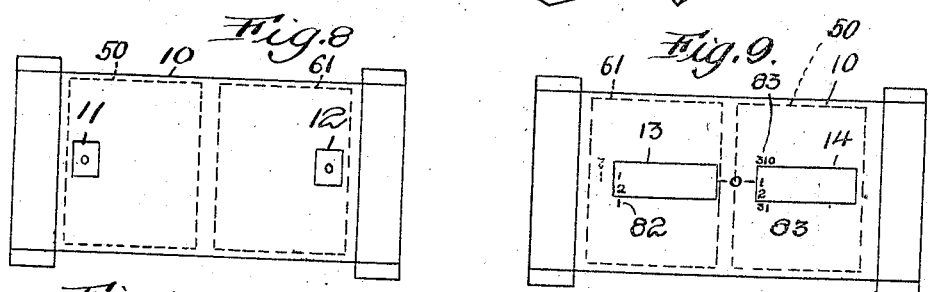
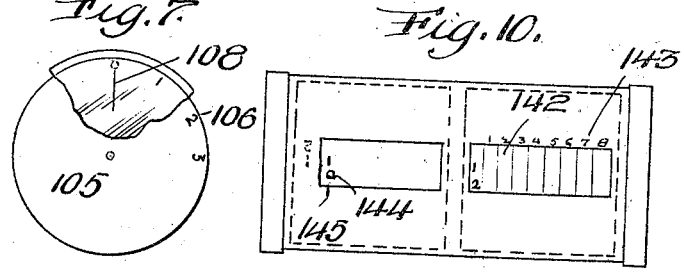
WITNESSES
Samuel Payne.
INVENTORS
W. D. McBride.
W. E. McBride.
By Henry E. Evert
ATTORNEY W. D. & W. E. McBRIDE.
COMPUTING SCALE.
APPLICATION FILED SEPT. 30, 1913.
1,118,666.
Patented Nov. 24, 1914.
3 SHEETS—SHEET 3.
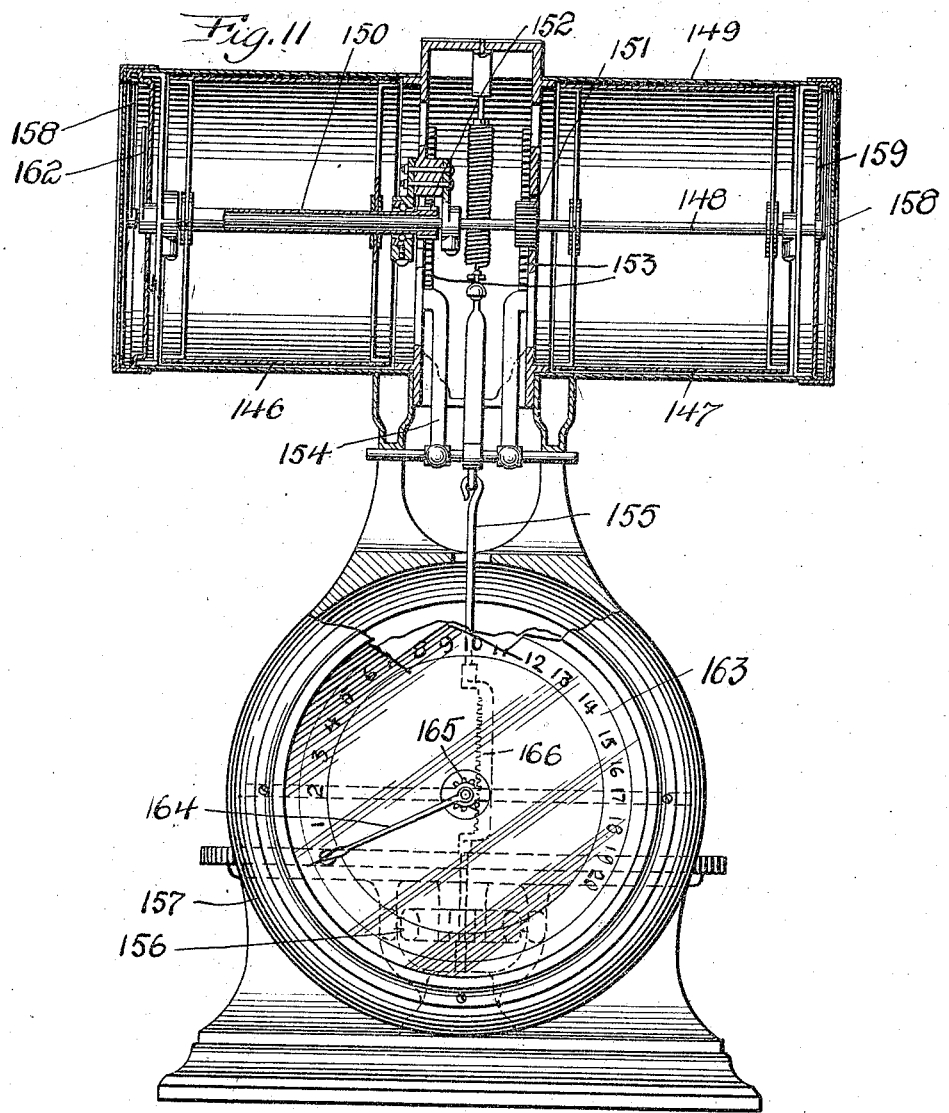
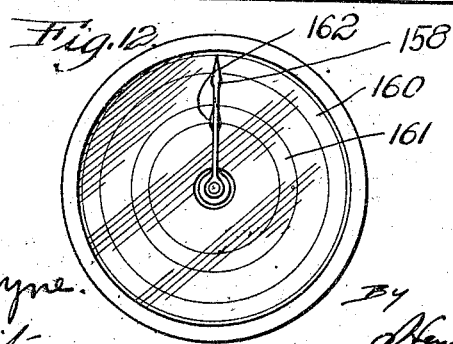

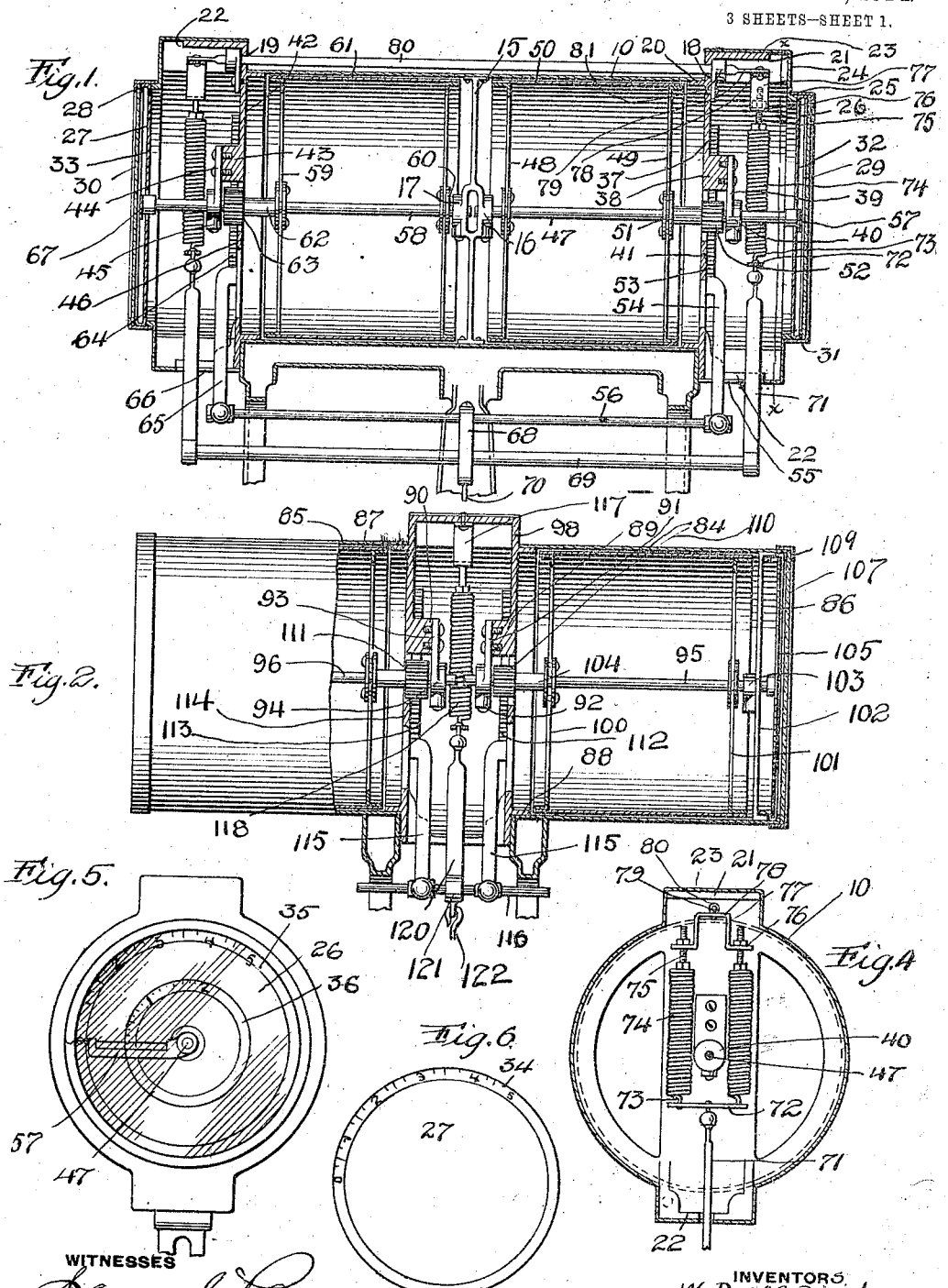

# UNITED STATES PATENT OFFICE.

WILSON D. McBRIDE AND WILLIAM E. McBRIDE, OF PITTSBURGH, PENNSYLVANIA.

COMPUTING-SCALE.

1,118,666.  Specification of Letters Patent.  Patented Nov. 24, 1914.

Application filed September 30, 1913. Serial No. 792,651.

*To all whom it may concern:*

Be it known that we, WILSON D. MCBRIDE and WILLIAM E. MCBRIDE, citizens of the United States of America, residing at Pittsburgh, in the county of Allegheny and State of Pennsylvania, have invented certain new and useful Improvements in Computing-Scales, of which the following is a specification, reference being had therein to the accompanying drawing.

This invention relates to computing scales, and the primary object thereof is to provide a thoroughly efficient means for computing the cost of a weighed article at a predetermined price per pound, said means enabling the salesman to quickly ascertain the cost of the article.

In computing scales it has been found that when the predetermined price per pound of an article is above thirty cents that when one computing cylinder is employed that the graduations for the higher priced goods cannot be arranged in a satisfactory manner for view, under such conditions causing a slight confusion and loss of time when a salesman endeavors to ascertain the weight and cost of a high priced article, and to this end the invention resides primarily in setting up a computing scale mechanism whereby the salesman cannot only quickly ascertain the cost of a low priced article after being weighed, but can quickly ascertain the cost of a high-priced article, after weighing, without loss of time or confusion.

A further object of the invention is to provide a computing scale mechanism not only including means for quickly setting up a visible indication of the cost of a low or high priced article, as well as the weight thereof through the drum casing of the mechanism, but to further provide means whereby the weight of the article will be visibly indicated from either end of the scale. Although the scale mechanism is designed primarily for use in weighing and computing the cost of an article, yet it is to be understood that it can also be adapted for use in connection with the weighing and computing the postage necessary for the parcel post.

Further objects of the invention are to provide a computing scale mechanism, for weighing and computing low and high priced articles, which is simple in its construction and arrangement, strong, durable, efficient and convenient in its use, indicating the weight of the weighed article from each end and from its side, readily set up and comparatively inexpensive to manufacture.

With the foregoing and other objects in view the invention resides in the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like numerals denote corresponding parts throughout the several views:—Figure 1 is a longitudinal sectional view of a computing scale mechanism in accordance with this invention, Fig. 2 is an elevation, partly in section, of a modified form of computing scale mechanism in accordance with this invention, Fig. 3 is a longitudinal sectional view of a modified form of computing scale mechanism in accordance with this invention, Fig. 4 is a view on line X—X of Fig. 1, the lower portion being broken away, Fig. 5 is an end view of Fig. 1, Fig. 6 is a view of the dial for the other end of Fig. 1, Fig. 7 is an end view of Fig. 2, Figs. 8 and 9 are diagrammatical views illustrating the visible indications provided by the computing cylinders, Fig. 10 is a diagrammatical view illustrating the computing cylinders for use for parcel post, Fig. 11 is a rear elevation of a modified construction of computing scale mechanism, and Fig. 12 is an end view of Fig. 11.

Referring to Fig. 1 of the drawings 10 denotes a casing which is provided at one side with openings 11 and 12 for exposing the weight of the article and on its other side with longitudinally extending slots 13, 14 for exposing the cost of the article. The casing 10 has arranged therein and at the center thereof a brace 15 provided centrally with a pair of bearings 16, 17. The casing 10 has abutting against each end thereof a ring and said rings are indicated by the reference characters 18, 19. The rings project outwardly with respect to each end of the cylinder and each of said rings is provided with a flange 20 secured to the inner face of the casing 10. Each of said rings is furthermore provided with a pair of supports 21, 22, said pairs of supports project in opposite directions with respect to each other and to each pair of supports is secured an annular band 23 which projects outwardly from its respective support and is provided with an inwardly extending annular flange 24. The inner end of the flange 24 is provided with a bead 25 and abutting against each of said beads 25 is a disk. One of the disks is indicated at 26 and the other at 27 and each of said disks is formed with an outwardly projecting flange 28. Abutting against the flanges 28 is a transparent member, in the form of a circular piece of glass and one of said members is indicated at 29 and the other at 30. The flanges 28 space the transparent members 29, 30 away from the disks 26, 27. The transparent members 29, 30 are secured in position by flanged rings 31, these latter are interiorly threaded and engage with threads formed on the beads 25 and the periphery of the flange 28. The flanges of the rings 31 are arranged against the outer face of the transparent members 29, 30. The space between the disk 26 and member 29 is indicated at 32 and the space between the disk 27 and the member 30 is indicated at 33. The spaces 32 and 33 provide clearances for a purpose to be presently referred to.

The disk 27 is stationary and is provided with graduations 34 to indicate pounds from one to twenty and the disk 26 is stationary and is provided with a circular row of graduations 35, the graduations 35 indicating pounds from one to ten.

The ring 18 has formed integral therewith a support 37 having an offset portion 38, to which is secured a hanger 39 provided with a bearing 40 and said ring 18 is furthermore provided with a transverse bar 41 which constitutes a rack guide. The support 37 also constitutes a rack guide. The ring 19 is provided with an integral support 42, having an offset portion 43 to which is secured a hanger 44, provided with a bearing 45, the support 42 constitutes a rack guide and the ring 19 is furthermore provided with a transverse bar 46, which also constitutes a rack guide.

Rotatably mounted in the bearings 16 and 40 and projecting through the disk 26 is an operating shaft 47 and to said shaft 47 through the medium of webs 48, 49 is fixedly secured a computing drum 50 having its periphery provided with graduations for computing the cost of high priced articles, that is to say, articles costing from thirty to sixty cents per pound. The web 49 is formed with an extended hub 51 for the shaft 47 and said shaft 47 between said hub 51 and bearing 40 is provided with a pinion 52 which engages a rack 53, the latter being guided by the support 37 and bar 41. The rack 53 has its lower end formed integral with a pulling arm 54, which extends down through an opening 55 in the flange 21 and is connected at its lower end to a coupling bar 56. The shaft 47 on that end which projects beyond the disk 26, is provided with a pointer 57 associating with the graduations 35. The space 32 provides a clearance for the movement of the pointer 57 when the same is carried around with the shaft 47 and the drum 50. The drum 50 is also provided with graduations to indicate the weight of the article through the opening 12 and the graduations for computing the cost of the article is indicated through the opening 14.

Rotatably mounted in the bearings 17 and 45 is an operating shaft 58, which projects through the disk 27 and fixedly secured to the shaft 58, by the webs 59, 60 is a drum 61, provided with graduations for computing the cost of low priced articles, that is to say, articles costing from two cents to thirty cents a pound. The graduations for computing the cost of low priced articles are visible through the opening 13. The drum 61 is furthermore provided with graduations for indicating the weight of the article and such graduations are exposed through the opening 11. The webs 59, 60 are fixedly secured to the inner face of the drum 61 and said web 59 is provided with an extended hub 62 for the shaft 68. Fixed to the shaft 58 between the bearing 45 and the hub 62 is a pinion 63 which meshes with a vertically disposed reciprocatory rack 64, the latter being guided by the support 42 and bar 46. The lower end of the rack 64 has formed integral therewith a pulling arm 65 which extends through an opening 66, in the flange 22 of the ring 19 and which has its lower end connected to the other end of the coupling bar 56. That end of the shaft 58 which projects beyond the disk 27 is provided with a pointer 67 which associates with the graduations 34 and is carried around with the shaft 38 and drum 61. The space 33 provides a clearance for the pointer 67.

The pinion 52 is of less diameter than the pinion 63, whereby the drum 50 will revolve faster than the drum 61, by way of example, the ration is two to one, but this ratio can be increased or diminished if desired. But two drums 50 and 61 are illustrated, but it is obvious that the number of drums can be increased if it be desired. The drums 50 and 61 are so set up that they will revolve in unison, but the drum 50 at a greater speed than the drum 61. The drum 50 on one revolution has its graduations to provide for the weighing and computing of from one to ten pounds, while the drum 61 has its graduations so arranged as to provide for the weighing and computing of from one to twenty pounds. The number of pounds weighed and computed by the drum 50 can be increased or diminished if desired, and a like arrangement can be had with respect to the drum 61, but preferably the drum 61 is adapted to weigh and compute the cost of low priced articles with a weight from one to twenty pounds and with a cost of from two cents to thirty cents per pound, and the drum 50 is adapted to weigh and compute the cost of high priced articles, weighing from one to ten pounds and costing from thirty-one to sixty cents per pound.

The racks 53 and 64 are reciprocated in one direction through the medium of a vertically movable operating arm 68 which is fixed at one end to the coupling bar 56 and is also fixed to a coupling rod 69 arranged below the coupling bar 56. The operating arm 68 is attached as at 70 to an operating mechanism therefor (not shown) and which is arranged in the scale base (not shown). The coupling rod 69 at each end has fixed thereto a vertically disposed pull bar 71, connected at its upper end to a cross head 72, to which is attached the lower ends 73 of a pair of coiled vertically disposed spaced retractile springs 74, which have their upper ends fixed to adjusting bolts 75, extending through the angular extension 76, formed on the lower ends of the arms 77, of an inverted yoke 78, which is fixed to a hanger 79. Arranged over the casing 10 is a longitudinally extending supporting rod 80 which projects through the rings 18 and 19 and also through the brackets 81 and which has connected to its ends the hangers 79. The brackets 81 are fixed to the rings 18 and 19. The function of the springs 74 is to return the shafts 47 and 58 to normal position, that is to say, when the article has been weighed and removed from the scale. A pair of springs 74 associates with the shaft 47 and a pair of springs 74 associates with the shaft 58. One pair of springs is arranged rearwardly of the disk 56 and the other pair is arranged rearwardly of the disk 27.

From the foregoing construction and arrangement of parts it is obvious that the operating mechanism which is connected to the operating arm 68 will cause the operation of the drums 50 and 61 in unison, and that when a salesman is weighing and computing low priced goods, that end of the scale in which is arranged the drum 61 and the graduations 34 will be employed, and that when the operator is weighing and computing the cost of high priced goods, that the drum 50 and the graduations 36 will be employed.

The casing 10 is provided with indications, as at 82 to designate the price per pound of low priced goods, and the casing 10 is furthermore provided with indications, as at 83 to indicate the price per pound of high priced goods. When weighing high priced goods and the weight of the same should exceed ten pounds, the cost of the first ten pounds can be readily ascertained by reference to the indication 83 which is arranged upon the casing 10 and by way of example, if the article should weight thirteen pounds, it would then be only necessary for the salesman to add to the cost of the indication 83 the cost of the three pounds or a fraction of a pound over ten pounds, if the goods should weigh a fraction of a pound over ten pounds.

Referring to Fig. 2 of the drawings the casing 10 is formed of two sections 84 and 85, the former associating with the high priced graduated drum 86 and the latter with the low priced graduated drum 87. The sections 84, 85 are provided with openings corresponding to the openings 11 and 12 and slots corresponding to the slots 13—14. The sections 84 and 85 are provided with indications similar to the indications upon the periphery of the casing 10. Interposed between the sections 84, 85 is a housing 98 having each end formed with an annular flange 88 which extend in and are secured to the inner face of the sections 84, 85 at the inner ends thereof. Each end of the housing 98 is formed with an inwardly extending offset portion and which are indicated at 89, 90. The offset portions oppose and are spaced from each other. Fixed to the offset portion 89 is a hanger 91 having its lower end provided with a bearing 92. Fixed to the offset portion 90 is a hanger 93 having its lower end provided with a bearing 94.

The reference characters 95, 96 denote a pair of operating shafts, the former for the low priced drum 87 and the latter for the high priced drum 86. The shafts 95 and 96 are supported in the same manner and the description of the support of one will apply to the description of the support of the other. Each of the shafts 95, 96 is connected to its respective drum by a pair of webs 100, 101 and one end of the shaft is mounted in a transverse bar 102 which is fixedly secured to its respective casing section and which is provided with a bearing 103 for the end of the shaft. The shaft 95 at its inner end is mounted in the bearing 92 and the shaft 96 at its inner end is mounted in the bearing 94. Each of the webs 100 is provided with an extended hub 104. Each shaft projects from its bearing 103 and has fixedly secured thereto, so as to rotate therewith, a disk 105 provided with graduations 106. The disk which is carried by the shaft 95 is provided with graduations for indicating pounds from one to ten, and the disk carried by the shaft 96 is provided with graduations for indicating pounds from one to twenty.

Fixedly secured to the end of each casing section is a transparent member 107 having a pointer 108 which associates with the graduations upon the disks 105. The transparent member 107 is fixedly secured in position by the flange 109. Carried on the inner ends of the shaft 95—96 are pinions 110 and 111 respectively, the former is interposed between the bearing 92 and the hub 104 and the latter is interposed between the bearing 94 and the other hub 104. The pinion 110 is of greater diameter than the pinion 111 whereby the drums 86, 87 will be operated in the same manner as the drums 50 and 61. The pinions 110 and 111 are operated by racks 112—113 guided by the bars 114 and the ends of the housing 98. The racks 112—113 are moved vertically in one direction by pulling-arms 115 which are fixedly secured to a coupling bar 116. Arranged within the housing 98 and suspended by the yoke 117 are a pair of retractile springs 118, only one of a pair is shown. These springs are adjustable and set up in the same manner as the springs 74 and the springs 118 are connected to a pull bar 120, which has its lower end provided with an eye 121 through which extends the coupling bar 116. The eye 121 is connected, as at 122 to an operating mechanism or balance arranged in the platform or scale base. When the racks 112—113 are shifted in one direction, it is against the action of the springs 118, this latter restoring the shafts 95, 96 to normal position when the article has been removed from the scale.

The construction shown in Fig. 2 is designed for operating both drums from the center of the scale, whereas the construction shown in Fig. 1 sets up a medium for operating both drums from both ends of the scale.

In Fig. 3 is illustrated a computing scale mechanism whereby both drums are operated from one end of the scale through the medium of a reciprocatory rod 123, the latter having its upper end connected to a pair of rack bars 124—125, the latter meshing with a pinion 126 and the former with a pinion 127. The pinion 126 is of less diameter than the pinion 127 and is utilized for revolving the high priced drum 128, which is carried by the shaft 129. Mounted upon the shaft 129 and supported by the bearings 130 and 131 is an auxiliary shaft 132 which carries the pinion 127 and which operates the low priced drum 133. The shaft 129 is mounted in bearings 134 and 135 and 136. The casing which incloses the drums is indicated by the reference characters 137 and has fixed to each end a disk 138 having graduations which associate with the pointers 139 carried on the ends of the shaft 129, the latter extending from one end to the other of the casing. Transparent members 140 are secured to each end of the casing by the retaining members 141.

In Fig. 10 of the drawings the adaptation of the scale is shown for use in the weighing of packages for parcel post and for computing the cost of postage. The parcel post graduations are indicated by the reference characters 142, 143, 144 and 145.

Referring to Fig. 11 of the drawings, the computing scale mechanism not only includes means for ascertaining the weight from each end of the scale but also from the scale base or below the computing drums.

In Fig. 11, 146 denotes the fast moving drum and 147 the slow moving drum, the latter being carried by a shaft 148, which extends from end to end of the casing 149 and projects from the fast moving drum 146.

The reference character 150 denotes a shaft mounted upon the shaft 148 and to which is fixed the drum 146. The shafts 148 and 150 are provided respectively with pinions 151, 152, the latter being of less diameter than the former and the said pinions 151 and 152 are operated by vertically movable racks 153, which are secured by a reciprocatory spring controlled actuating element 154, the latter being connected to a link 155 to the balance 156 in the base 157 of the scale.

Carried by each end of the shaft 148 is a pointer 158 which associates with graduations upon the fixed disks 159. The disks are arranged at the ends of the casing 149 and one of said disks 159 is provided with an outer and inner set of graduations 160, 161, respectively. The pointer 158 associates with the outer graduations 160, while associated with the inner graduations 161 is a pointer 162 which is carried by the shaft 150, inwardly with respect to the pointer 158. By providing one disk with the two sets of graduations, one associated with the fast moving drum and the other with the slow moving drum, the weight of the article, whether it be a high priced article or a low priced article can be determined from that end of the casing provided with the fast moving drum. By way of example, the drum 146 revolves twice as fast as the drum 147 and the pointer 162 will make two revolutions while the pointer 158 makes one, and one can readily ascertain that the pointer 158 has moved three-quarters of its movement, that the pointer 162 has traveled one complete revolution and a quarter. The graduations 160 would be, by way of example, from one to twenty pounds while the graduations 161 will be from one to ten. If the pointer 162 moves a revolution and a quarter, it would indicate fifteen pounds, while the pointer 158 having moved but three-quarters of a revolution would indicate fifteen pounds in the graduations.

The scale base is provided with a set of graduations 163 with which associates a pointer 164, the latter carrying a gear 165 which operatively engages in a rack 166 forming a part of a link 155, under such conditions when the link 155 reciprocates, the pointer 164 will be shifted to indicate the weight of the article. The graduations 163, if desired can be set up for use in connection with parcel post. If desired parcel post graduations can be arranged upon the disks at each end of the casing that incloses the computing scale mechanisms as set forth. By utilizing two or more drums for the computing graduations, and revolving the high priced computing drum at less speed than the low priced computing drum and reducing the number of pound indications upon the high priced computing drum, the graduations can be made very much larger so that no confusion will be had or time lost when a salesman desires to ascertain computation of the cost of the article weighed.

The scale mechanism as illustrated and described not only provides visible indications of the weight at the side of the scale but also from each end thereof.

What we claim is:—

1. A computing scale comprising a pair of computing drums, one of which is provided with graduations for high priced articles and the other of which is provided with graduations for low priced articles, means whereby said drums are operated in unison, and whereby that drum for computing the cost of low priced articles will be revolved at less speed than the other drum, and means whereby the weight of the article will be indicated at the side and at each end of the drum.

2. A computing scale mechanism comprising a pair of drums, each of which is provided with different graduations for computation, means for simultaneously operating said drums, for operating one of said drums at greater speed than the other, thereby enabling a greater space being employed on said drum for any set of graduations on said drum to compute cost to any given weight indicated on said drum.

3. A computing scale comprising an indicating mechanism for indicating the cost of goods to a predetermined price, an indicating mechanism for indicating the cost of goods above said predetermined price, means for operating said indicating mechanisms simultaneously, and whereby one of said indicating mechanisms will be operated at a greater speed than and while operating in unison with the other, thereby enabling a greater space being employed on said indicating mechanism for any set of graduations on said indicating mechanism to compute cost to any given weight indicated on said indicating mechanism.

4. A computing scale comprising an indicating mechanism for indicating the cost of goods to a predetermined price, an indicating mechanism for indicating the cost of goods above said predetermined price, means for operating said indicating mechanisms simultaneously, and whereby one of said indicating mechanisms will be operated at a greater speed than and while operating in unison with the other, and end indicating mechanisms associated with the first mentioned pair of indicating mechanisms, said end indicating mechanisms operating in unison with the first mentioned indicating mechanisms.

5. A computing scale mechanism comprising a pair of drums, each of which is provided with different graduations for computation, means for simultaneously operating said drums, means for operating one of said drums at greater speed than the other, means for indicating the weight of the article from the outer end of each drum, and means for indicating the weight of the article below the drums.

6. A computing scale mechanism comprising a pair of drums, each of which is provided with different graduations for computation, means for simultaneously operating said drums, and means for operating one of said drums at greater speed than the other, and means for indicating the weight of the article below the drums.

7. A computing scale mechanism comprising a pair of drums, each of which is provided with different graduations for computation, means for simultaneously operating said drums, and for operating one of said drums at greater speed than the other, means for indicating the weight of the article with respect to both drums at the end of one of the drums, and means for indicating the weight of the article with respect to the other drum at the outer end of said other drum.

8. A computing scale mechanism comprising a pair of drums each of which is provided with different graduations for computation, a mechanism operated from the scale balance for simultaneously operating said drums, said mechanism including means for operating one of said drums at greater speed than the other.

9. A computing scale mechanism comprising a pair of drums, each of which is provided with different graduations for computation, a mechanism operated from the scale balance for simultaneously operating said drums, said mechanism including means for operating one of said drums at greater speed than the other, and means arranged below said drums for indicating the weight of the article.

10. A computing scale mechanism comprising a pair of drums, each of which is provided with different graduations for computation, a mechanism operated from the scale balance for simultaneously operating said drums, said mechanism including means for operating one of said drums at greater speed than the other, means arranged below said drums for indicating the weight of the article, means at the end of one drum for indicating the weight of the article with respect to said drum, and means at the end of the other drum for indicating the weight of the article with respect to the said drums.

In testimony whereof we affix our signatures in the presence of two witnesses.

WILSON D. McBRIDE.
WILLIAM E. McBRIDE.

Witnesses:
Max H. Srolovitz,
N. L. Bogan.